US00H002205H

(19) United States

(12) Statutory Invention Registration

Andersen et al.

(10) Reg. No.: US H2205 H

(43) Published: Nov. 6, 2007

(54) METHOD AND APPARATUS FOR PURGING A PROPELLANT FROM A FILLING HEAD DURING THE FILLING OF AN AEROSOL CONTAINER

(76) Inventors: Jason D. Andersen, 234 Perry Ave., Racine, WI (US) 53140; Lienert Josef, Breitenstrasse 81, Wilen (CH), 8832; Richard H. Middleton, 1725 Madison Rd., Kenosha, WI (US) 53140; Heinz Spieser, Kapellstrasse 11, Lachen (CH), 8853

(21) Appl. No.: 11/177,684

(22) Filed: Jul. 8, 2005

Related U.S. Application Data

(60) Provisional application No. 60/590,124, filed on Jul. 22, 2004.

(51) Int. Cl.
*B65B 30/00* (2006.01)

(52) U.S. Cl. ..... 141/20

(58) Field of Classification Search ..... None
See application file for complete search history.

(56) References Cited

U.S. PATENT DOCUMENTS 4,872,491 A * 10/1989 Nickason et al. ..... 141/20
6,948,534 B1 * 9/2005 Hirz ..... 141/20

* cited by examiner

*Primary Examiner*—Dan Pihulic

(74) *Attorney, Agent, or Firm*—Frank B. McDonald

(57) ABSTRACT

A method and apparatus for minimizing propellant emissions during the filling of an aerosol container that has a valve attached thereto and a valve stem extending from the valve. A filling head is disposed in a sealed relationship with a portion of the container so that the valve stem is encased within a recess of the filling head. A pressurized propellant is introduced into the filling head at a sufficient pressure to force the propellant through and around the valve stem and into the container. An incompressible purge medium is introduced into the filling head at a sufficient pressure to force the incompressible purge medium through and around the vale stem, wherein the incompressible purge medium flushes out residual propellant from the filling head and into the container.

20 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR PURGING A PROPELLANT FROM A FILLING HEAD DURING THE FILLING OF AN AEROSOL CONTAINER

CROSS REFERENCE TO RELATED APPLICATIONS

This application claims the benefit of U.S. Provisional Application No. 60/590,124, filed Jul. 22, 2004.

BACKGROUND OF THE INVENTION

1. Field of the Invention

The present disclosure relates to a method and an apparatus for minimizing propellant emissions during the filling of aerosol containers, and more particularly, to purging devices and methods that utilize purge media to minimize propellant emissions.

2. Description of the Background of the Invention

A common method of charging an aerosol container with a propellant is a standard pressure filling process. In this process, the propellant is forced into the container through and around an aerosol valve stem that extends from the container. This is generally accomplished with a filling apparatus that fits over the valve stem and seals the container environment and/or engages the valve stem in a sealed relationship. The valve stem is depressed and the propellant is introduced under pressure into and around the valve stem. After this filling process, the apparatus is retracted and excess propellant left within the apparatus and the valve stem is released into the surrounding air. Release of certain propellants has been identified as a potential ecological problem and has been a factor in the motivation to develop technologies that prevent such release. Conventional solutions to this problem have involved the use of purging gases, such as nitrogen, to purge propellant from voids in the filling apparatus and the valve stem prior to the retraction of the apparatus. However, a significant amount of propellant is still released into the atmosphere following the retraction of the filling apparatus using these conventional solutions. There is a need to minimize propellant emissions during the filling of aerosol containers that has not been met by the current art.

As noted above, the prior art includes numerous examples of pressure filling apparatuses and processes that do not provide a solution to the release of propellants into the atmosphere. For example, one known process for filling a can with a pressurized propellant or a product includes disposing the can beneath a crimper head. The can includes an unsealed closure disposed on a top of the can, wherein the closure includes a dip tube and a spray nozzle. The crimper head is lowered to engage the top of the can to form a seal around a rim of the can. A vacuum is applied to the can to lift the closure from the top of the can and to remove any residual air or vapor from within the can. The propellant or product, in either liquid or gaseous form, is introduced into the can under pressure. After introduction of the propellant or product into the can, the container is lifted upward a small distance and the closure is crimped to the can.

In another known filling apparatus, a container includes a valve assembly disposed on a top opening of the container. The valve assembly includes an inlet port that is connected to an inlet passageway. A supply nozzle is provided that may be connected to the inlet port. Liquid is transferred from a liquid supply and sent progressively through the supply nozzle, inlet port, and inlet passageway into the container.

Further, a relief passageway connects the interior of the container to a relief port outside the container.

Yet another known filling apparatus for filling aerosol cans with a pressurized liquid includes a base with a can support assembly wherein the can support assembly comprises a support platform that can be urged upward by a biasing spring. A can is disposed on the support platform during a can filling operation, wherein the can is moved upward to force a filling orifice of the can into a can receiving element. The can receiving element aligns the filling orifice of the can with a discharge orifice of a liquid reservoir to place the can in a filling position. The liquid reservoir has a tapered bottom in fluid communication with a pump rod receiving aperture. A downward motion of a main piston pump rod through the filling reservoir and into the aperture pressurizes the fluid prior to being discharged through the discharge orifice and into the filling orifice of the can. A ball check valve assembly forms a closing mechanism that allows the filling reservoir to be pressurized only by the downward motion of the piston, and not by the upward release of propellant from the can. The can is disengaged from this filling position by depressing a lever mechanically connected to the support platform.

In a different known filling process, a dispenser device includes a receptacle and a dispenser member, such as a metering valve, for dispensing a fluid such as an active substance or propellant. The dispenser member is assembled onto the receptacle in a leak-tight manner and a predetermined amount of propellant is introduced into the receptacle and/or dispenser member. After filling the dispenser device with propellant, the device is stored for a predetermined period of time and then tested for defects, such as a leak. The dispensers that pass the defect test are filled with the active substance.

Yet another known filling apparatus for filling containers with propellant includes an aerosol container filling adapter that is placed in a sealed relationship with a valve cup of the container. The valve cup includes interior walls, a bottom wall and a central island. An aerosol valve is disposed within the island, wherein the aerosol valve includes a valve stem extending therefrom and through the island and outside the container. The valve stem further extends into a bore of the adapter. A metered volume of propellant is delivered through a passage of the adapter and into the bore, wherein the pressure in the bore is sufficient to depress the valve stem. The aerosol valve is therefore opened and propellant is injected through the valve and into the container.

SUMMARY OF THE INVENTION

According to one embodiment of the present invention, a method of minimizing propellant emissions during the filling of an aerosol container is disclosed. The aerosol container has a valve attached thereto and a valve stem extending from the valve. The method includes the step of engaging a filling head with the container so as to encase the valve stem within a recess of the filling head. The filling head is further disposed in a sealed relationship with a portion of the container. A first volume of a pressurized propellant is introduced into the filling head at a sufficient pressure to force the propellant through and around the valve stem and into the container. A second volume of an incompressible purge medium is introduced into the filling head at a sufficient pressure to force the incompressible purge medium through and around the valve stem, wherein the incompressible purge medium flushes out residual propellant from the filling head and into the container. The method further includes the step of disengaging the filling head from the container.

According to another embodiment of the present invention, a filling head comprises first means for forming a fluid-tight filling passage. Second means for selectively supplying propellant under pressure to the first forming means are also provided. Further, the filling head includes third means for selectively supplying an incompressible purge medium to the first forming means.

According to yet another embodiment of the present invention, a filling head comprises a lower portion adapted to encase a valve stem of a container. A propellant inlet port is provided that is in fluid communication with a propellant conduit. A first valve is also provided that is adapted to move between a closed position and an open position. When the first valve is in the closed position a sealing surface of the first valve is sealingly engaged with a valve seat. When the first valve is in the open position the sealing surface is spaced from the valve seat. The open position places the propellant conduit in fluid communication with a first exit chamber. A purge medium inlet port is provided that is in fluid communication with a purge medium conduit. A second valve is also provided that is adapted to move between a closed position and an open position. When the second valve is in the closed position a second sealing surface of the second valve is sealingly engaged with a second valve seat. When the second valve is in the open position the second sealing surface is spaced from the second valve seat. The open position places the purge medium conduit in fluid communication with a second exit chamber.

Other aspects and advantages of the present invention will become apparent upon consideration of the following detailed description and the attached drawings, in which like elements are assigned like reference numerals.

DETAILED DESCRIPTION OF THE DRAWINGS

Figure 1:
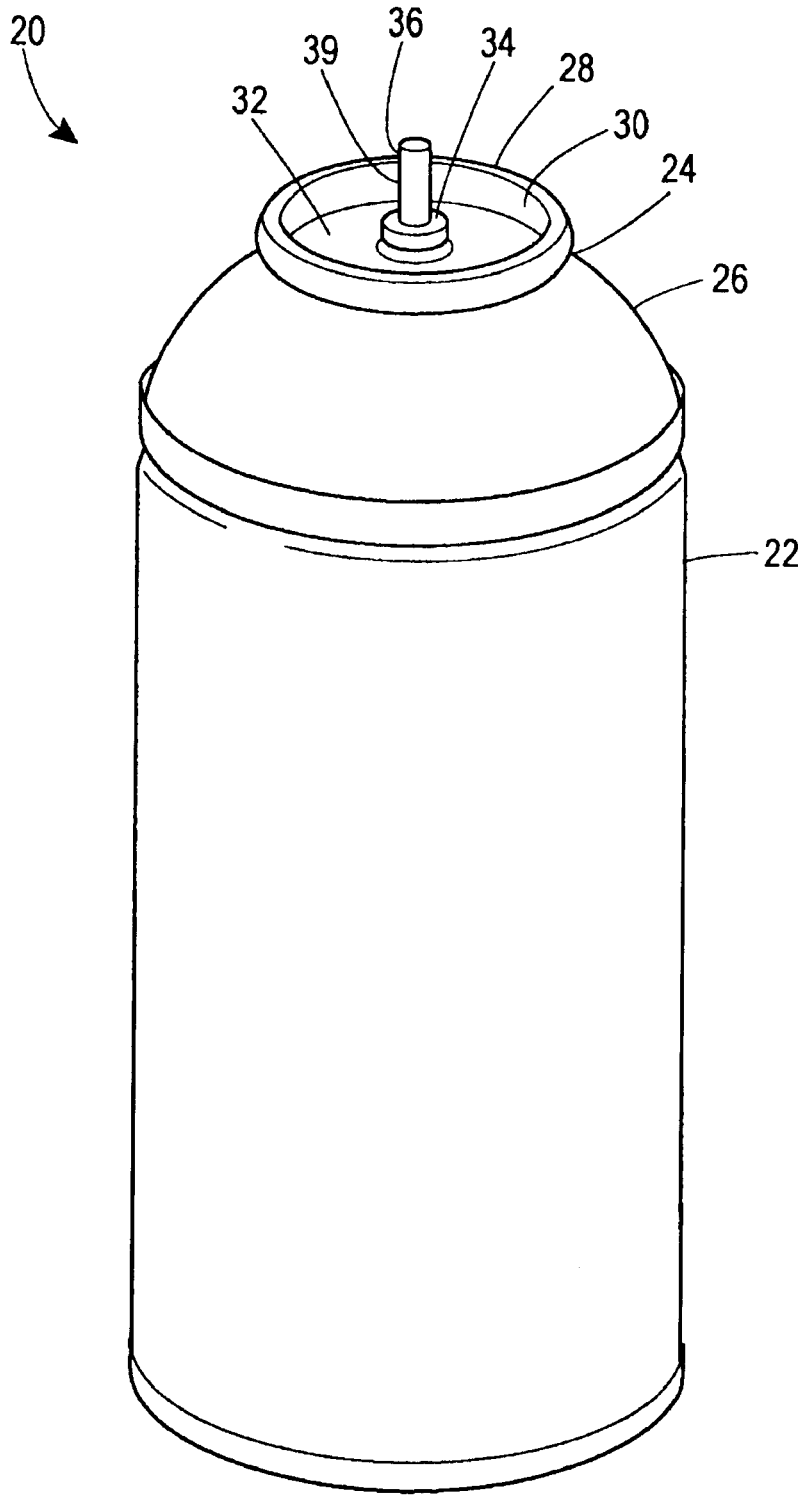
FIG. 1 is an isometric view of one type of aerosol container.
Figure 2:
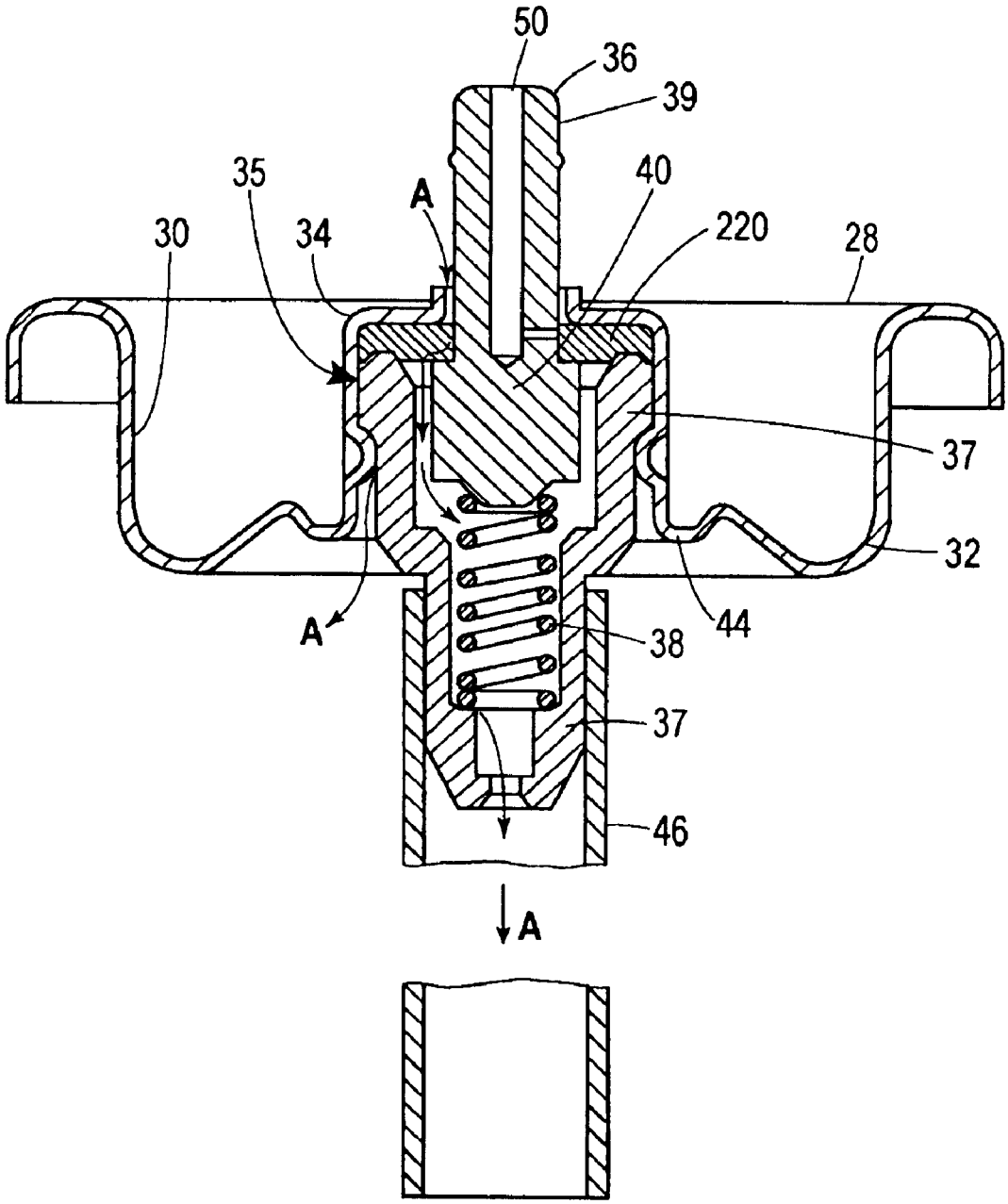
FIG. 2 is a cross sectional view of one type of aerosol valve of the aerosol container of FIG. 1.

FIGS. 1 and 2 depict one type of aerosol container 20 well known to those skilled in the art. The aerosol container 20 comprises a body 22 with an opening 24 at a top end 26 thereof. A mounting cup 28 is crimped to the opening 24 of the container 20 to seal the top end 26 of the body 22. The mounting cup 28 is generally circular in geometry and may include an outer wall 30 that extends upwardly from a base 32 of the mounting cup 28 adjacent the area of crimping. A pedestal 34 also extends upwardly from a central portion of the base 32. A valve assembly 35 includes a valve stem 36, a valve body 37, and a valve spring 38. The valve stem 36 extends through the pedestal 34, wherein a distal end 39 extends upwardly away from the pedestal 34 and a proximal end 40 is disposed within the valve body 37. The valve body 37 is secured within an inner side 44 of the mounting cup 28. A dip tube 46 may be attached to the valve body 37. The dip tube 46 extends downwardly into an interior of the body 22 of the container 20. A button or other actuator (not shown) may be assembled onto the distal end 39 of the valve stem 36. A user depresses the button or other actuator to open the valve assembly 35. When the valve assembly 35 is opened, a pressure differential between the container interior and the atmosphere forces the contents of the container 20 out through an orifice 50 of the valve stem 36 and an exit orifice (not shown) of the button or other actuator. While the present disclosure described the applicants' invention with respect to aerosol container 20, the present invention may be practiced with any type of aerosol container known to those skilled in the art.

Most aerosol containers use pressurized liquified petroleum gas (hereinafter "LPG") or the like as a propellant to force a product (such as hairspray, insecticide, shaving cream, spray paint, etc.) out of a container through an aerosol valve. However, numerous types of hydrocarbon and non-hydrocarbon propellants may also be used. One method of charging the aerosol container 20 with any of these propellants is a standard pressure filling process well known to those skilled in the art. In this process, the mounting cup 28 is crimped to the container 20 after the container has been filled with the product to be dispensed. The propellant is then forced into the container 20 through and around the aerosol valve stem 36. This filling process is typically accomplished by using a filling head 100 such as that depicted in FIGS. 3–5 and described in greater detail hereinafter. Other standard pressure filling processes known to those skilled in the art provide for the propellant to be injected into the container 20 prior to the product, while in yet other processes the propellant and product are injected into the container 20 simultaneously.

Figure 3:
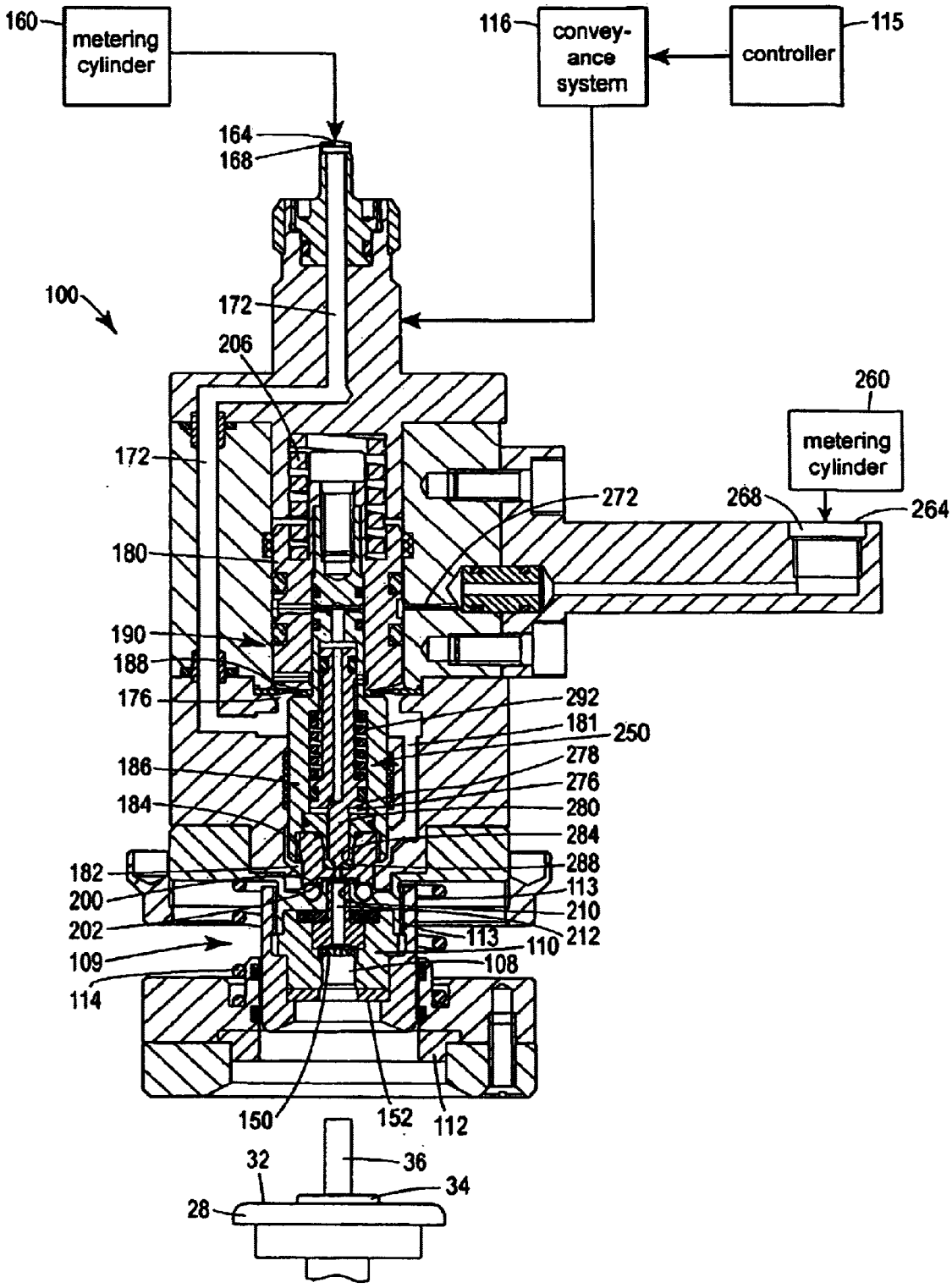
FIG. 3 is a cross-sectional view of one type of filling head and a top end of the aerosol container in a pre-fill position.
Figure 4:
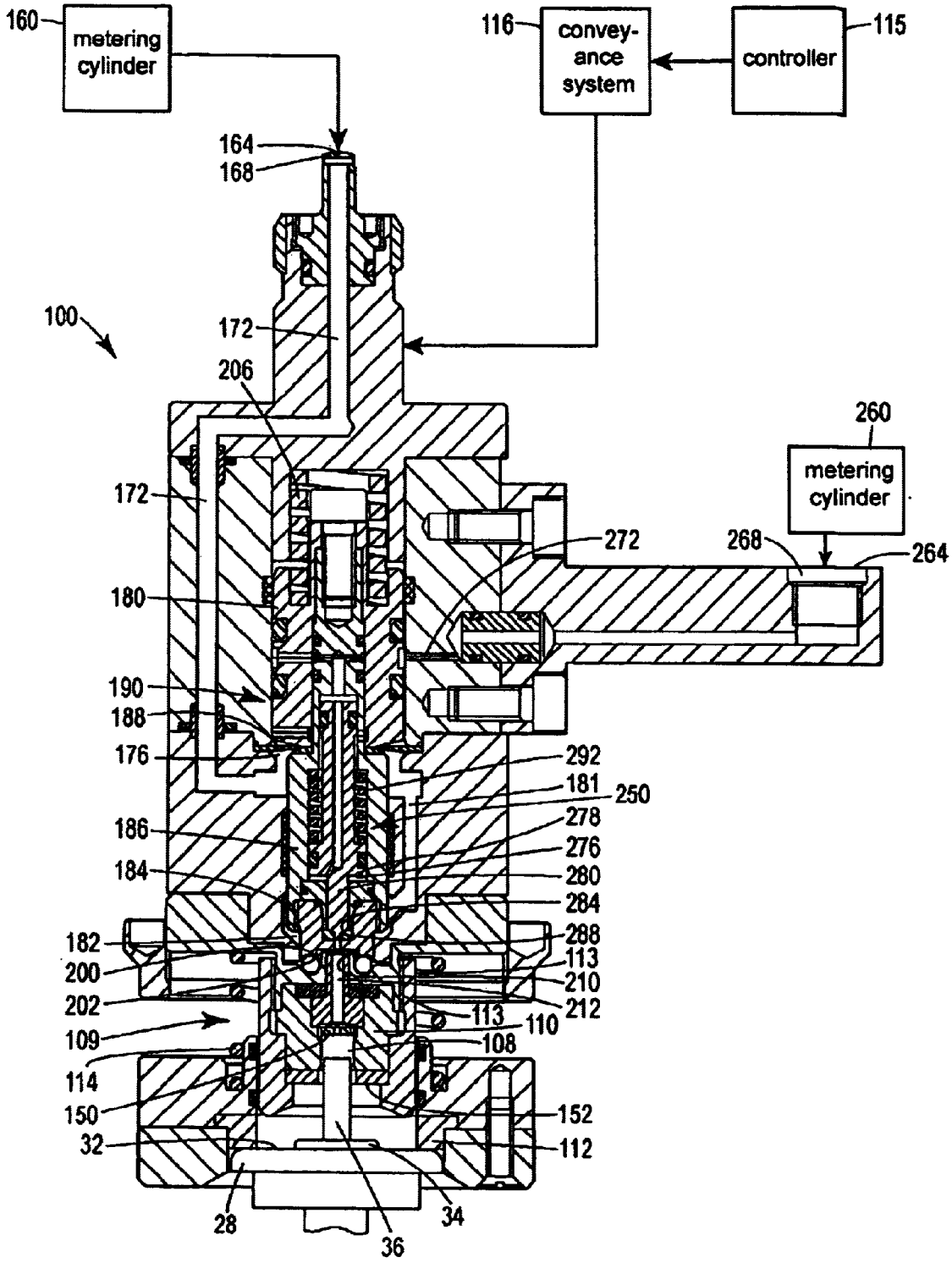
FIG. 4 is a cross-sectional view similar to FIG. 3 of the filling head being lowered and centered onto the top end of the aerosol container.
Figure 5:
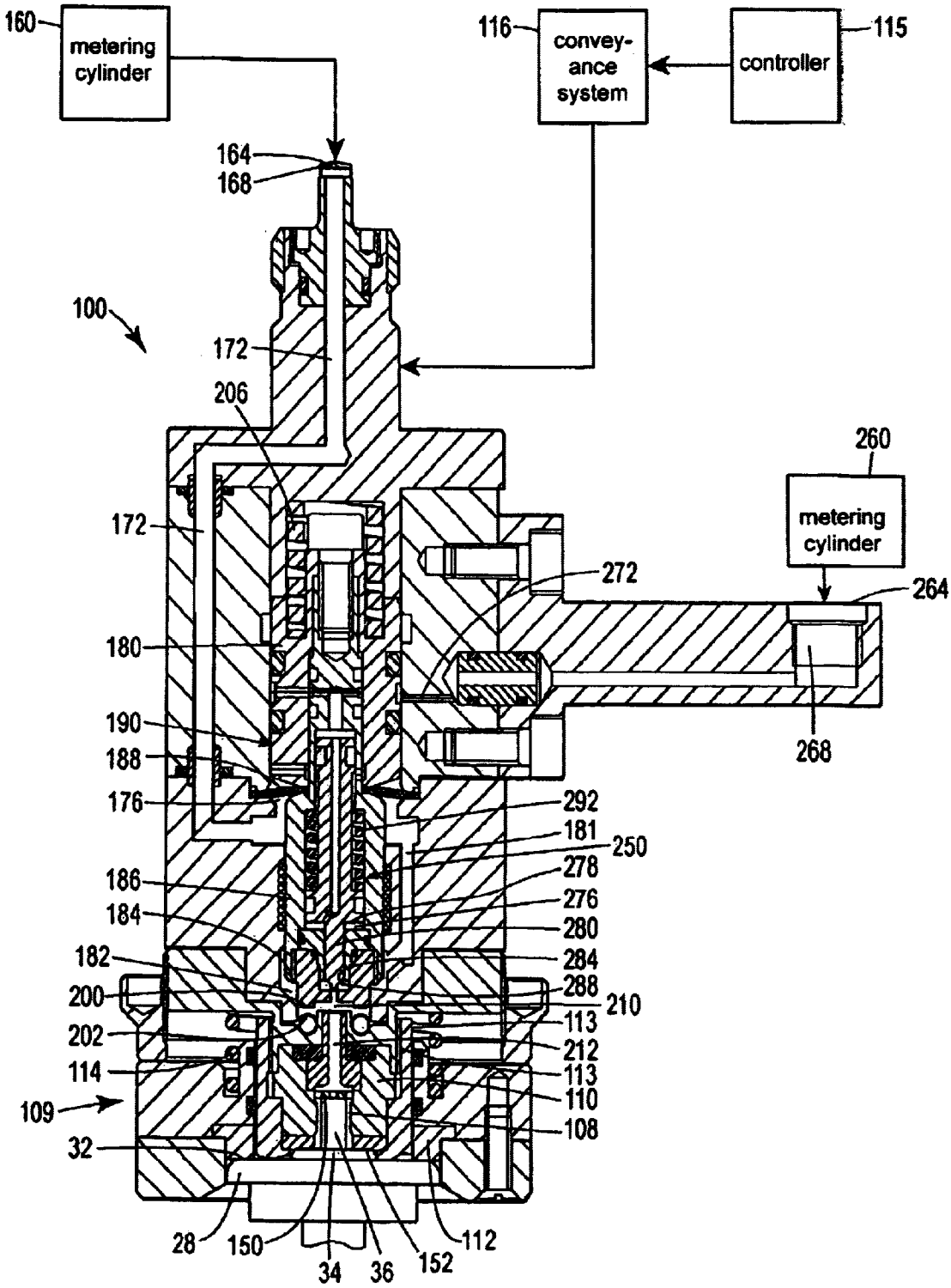
FIG. 5 is a cross-sectional view similar to FIG. 3 of the filling head in a sealed relationship with the top end of the aerosol container during a propellant filling cycle.

FIGS. 3–5 show a recess 108 disposed within a lower portion 109 of the filling head 100. The lower portion 109 includes an inner portion 110, wherein the recess 108 is disposed within the inner portion 110. The lower portion 109 also includes an outer portion 112, otherwise known as a centering bell, that surrounds the inner portion 110. In the present embodiment, the inner portion 110 is detachable at threaded portions 113, thereby allowing the inner portion 110 to be separated into two pieces for ease of replacement and/or to adjust the parameters of the inner portion 110 to suit a particular filling need. In some embodiments, the lower portion 109 is also detachable so that the lower portion 109, or a component of the lower portion 109 such as the inner and outer portions 110, 112, may be replaced.

Both of the inner and outer portions 110, 112 have a cylindrical cross section. The outer portion 112 is axially movable over the inner portion 110, and a first spring 114 biases the outer portion 112 toward a fully extended position at which the outer portion 112 is spaced a maximum distance from the inner portion 110 as shown in FIG. 4. The inner and outer portions 110, 112 of the filling head 100 are dimensioned to engage with portions of the mounting cup 28 and other structure adjacent the container 20. In one embodiment, the valve stem 36 extends into the recess 108 of the inner portion 110, wherein the inner portion 110 is positioned into a sealing relationship with the pedestal 34 and/or the base 32 of the mounting cup 28 to form a fluid-tight filling passage. In other embodiments, the inner portion 110 of the filling head 100 is placed in a sealing relationship with the valve stem 36 or the outer wall 30 of the mounting cup 28. Those skilled in the art will realize numerous ways to create a sealed environment around the valve stem 36. Additionally, the filling head 100 can be configured to accommodate operations in which the button of the aerosol valve 42 is positioned on the valve stem 36. In this "button-on" filling method, the recess 108 within the inner portion 110 of the filling head 100 is preferably shaped to create a sealing relationship with an outer surface of the button and/or to seal against the mounting cup 28 of the container 20. Further, the filling head 100 can be configured to work with aerosol containers having female valves, wherein the container includes a gasket but does not have a protruding valve stem. In this embodiment, the filling head 100 is modified to include a male member that extends into a cavity of the container adjacent the gasket. Still further, the filling head 100 may be adapted for use in bottom filling operations, wherein the propellant is sealed within a container separate from the product. Indeed, one skilled in the art will understand that the present invention may be used with any container in which a sealing relationship may be formed between the container and the filling head 100.

Prior to initiating the filling process, the filling head 100 is in a pre-filling position as depicted in FIG. 3. The inner and outer portions 110, 112 are spaced from the various structures of the container 20. FIG. 4 shows the filling head 100 being lowered toward a fill position, wherein the filling head 100 is positioned such that the valve stem 36 is substantially centered within the recess 108 of the filling head 100. At the position shown in FIG. 4 the outer portion 112 of the filling head 100 is contacting the mounting cup 28 and is disposed at the fully extended position. A controller 115 controls a conveyance system 116 for lowering and lifting the filling head 100 during successive fill operations. FIG. 5 shows the filling head 100 in the fill position, wherein the inner portion 110 of the filling head 100 is in a sealed relationship with the pedestal 34 and the valve stem 36 is depressed. As may be seen in FIG. 5, the outer portion 112 of the filling head provides a centering function. After the outer portion 112 of the filling head 100 enters into contact with a portion of the container 20, the controller 115 operates the conveyance system 116 cause the filling head 100 to continue to move downwardly, thereby causing the inner portion 110 of the filling head 100 to axially move relative to the outer portion 112 against the force exerted by the first spring 114. The inner portion 110 thus moves toward the container 20 while the outer portion 112 is stationary and in contact with the container 20. During the movement an engagement element within the recess 108 of the inner portion 110 depresses the valve stem 36. In a preferred embodiment, the engaging element is an upper wall 150 partially defining the recess 108. The axial extent of the valve stem 36 and the distance between the upper wall 150 and a bottom surface 152 of the inner portion 110 are selected such that the valve stem 36 is sufficiently depressed at the end of a stroke of the conveyance system 116 while the bottom surface 152 is in sealing contact with the pedestal 34.

Figure 6:
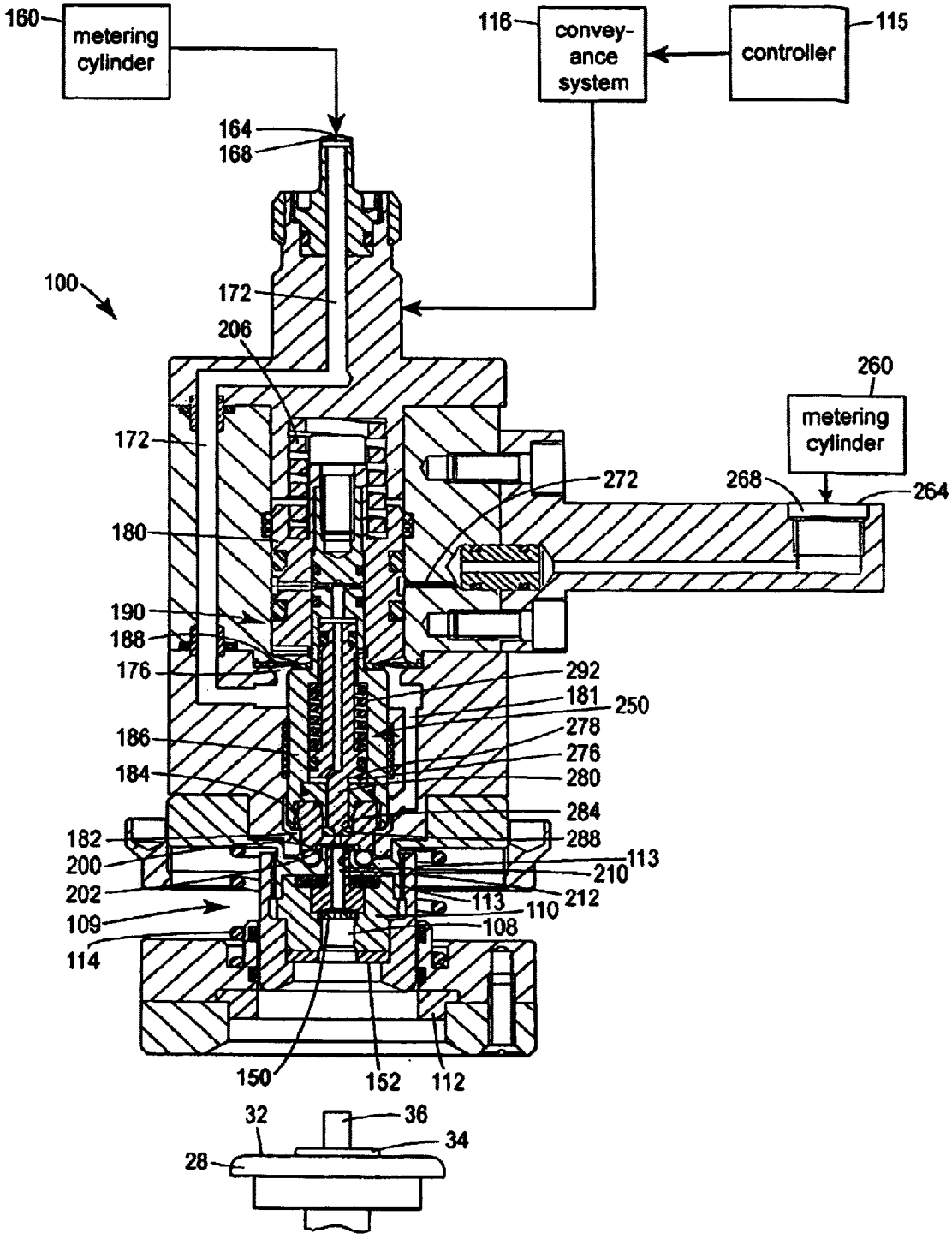
FIG. 6 is a cross-sectional view similar to FIG. 3 of the filling head and a top end of a second type of container in a pre-fill position.
Figure 7:
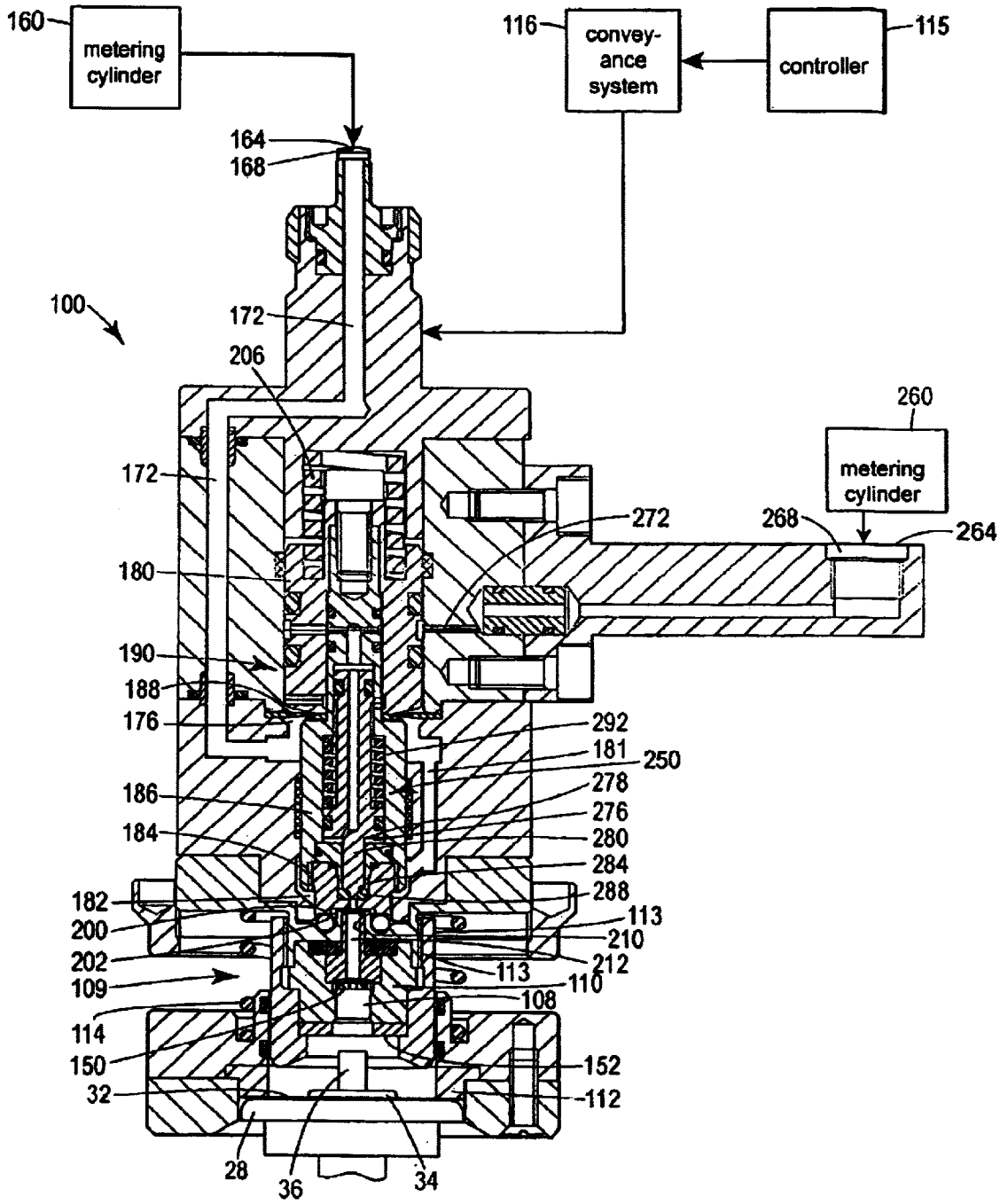
FIG. 7 is a cross-sectional view of the filling head being lowered and centered onto the top end of the aerosol container of FIG. 6.
Figure 8:
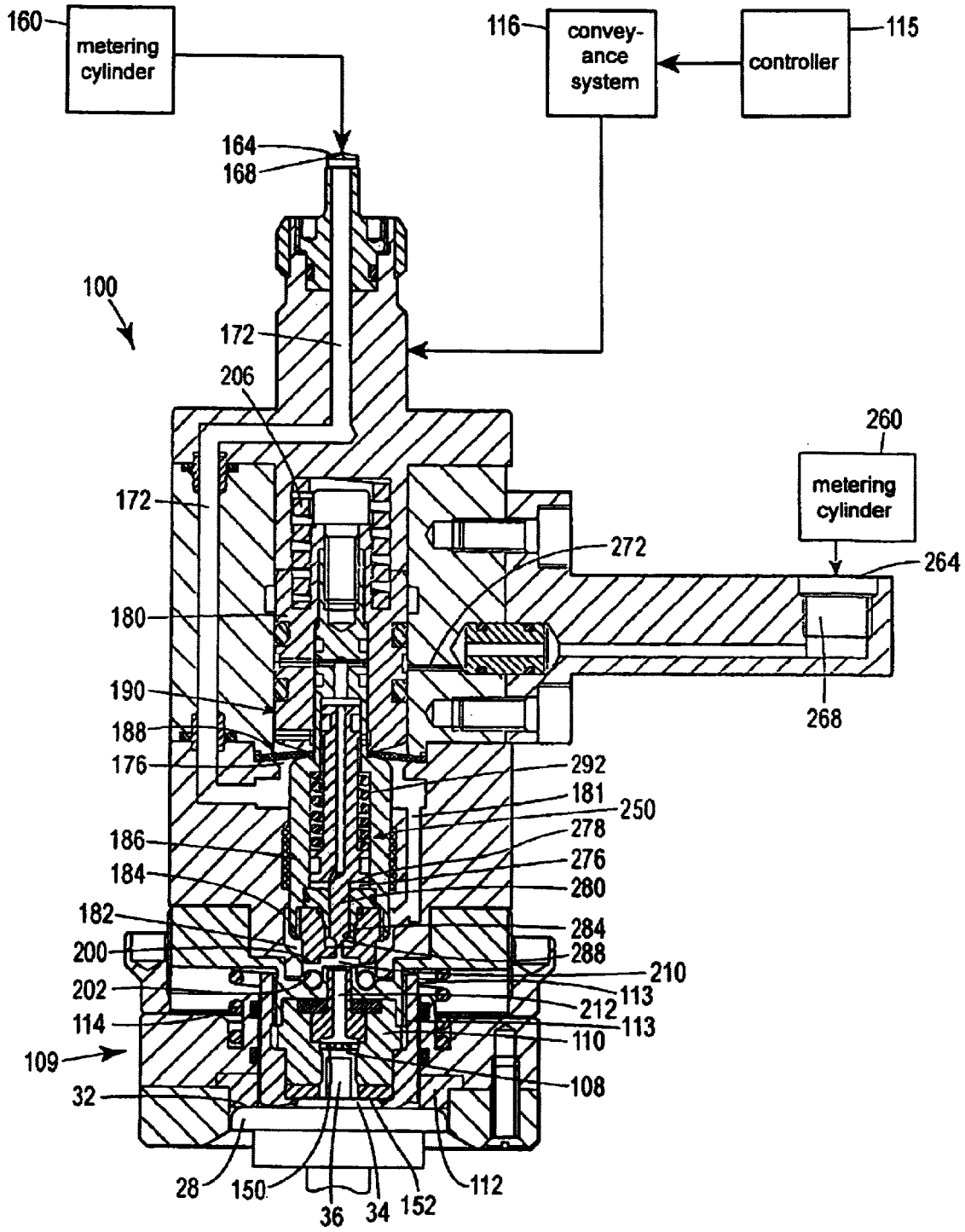
FIG. 8 is a cross-sectional view of the filling head in a sealed relationship with the top end of the aerosol container of FIG. 6 during a propellant filling cycle.

In another embodiment, the valve stem 36 is not opened by mechanical forces, but is instead opened by the fluid force of the pressurized propellant. In such as embodiment, the portion of the valve stem 36 extending from the pedestal 34 may be shortened so as not to engage with the upper wall 150. FIGS. 6–8 show a filling process similar to that shown in FIGS. 3–5, wherein FIG. 6 shows a pre-fill position, FIG. 7 shows a lowering and centering operation, and FIG. 8 shows the filling head 100 in a sealed relationship with the pedestal 34 of the container 20 at the fill position. In another embodiment, the valve stem 36 is not shortened as compared to the embodiment shown in FIGS. 3–5, and instead the position of the upper wall 150 within the inner portion 110 is adjusted so as not to contact the valve stem 36 when the filling head 100 is in the fully downward position (i.e., at the end of the stroke of the conveyance system 116). More generally, by adjusting the position of the upper wall 150, the user can allow the filling head 100 to depress valve stems having different lengths, or can prevent contact between the valve stem 36 and the upper wall 150. In other embodiments that open the valve stem 36 by fluid forces, the upper wall 150 or other engaging element may be omitted and/or the filling head 100 may not be lowered as far, provided that adequate sealing can be accomplished between the filling head 100 and the container 20. In yet another embodiment, both mechanical and fluid forces may be used to open the valve stem 36, wherein a combination of the upper wall 150 engaging the valve stem 36 and fluid forces impinging against the valve stem 36 depress same.

In a different embodiment, the lower portion 109 does not include the outer portion 112. In this embodiment, the lower portion 109 is modified to not require a centering bell or an equivalent thereof that descends toward the container 20 before the inner portion 110 is in sealing engagement with the container 20. Therefore, the container 20 must be aligned prior to the filling operation so that the inner portion 110 enters into a sealed relationship with a portion of the container 20 around the valve stem 36 when the filling head has descended into the fill position. It is preferred that the inner portion 110, or equivalent thereof, be mechanically adjustable so that one lower portion 109 may be used for different filling operations.

In any of the embodiments described herein, once the filling head 100 is positioned over the valve stem 36 in the fill position, a propellant filling cycle begins. FIGS. 5 and 8 depict the initial phase of the cycle, wherein a first metering cylinder 160 is operated by a control (which may be controller 115) to introduce a predetermined amount of pressurized propellant into the filling head 100. The predetermined amount of propellant supplied to the filling head 100 comprises a first volume typically within a range of about 5 cc. (0.31 $in^3$) to about 1200 cc. (73.23 $in^3$), and more typically a first volume within a range of about 30 cc. (1.83 $in^3$) to about 600 cc. (36.63 $in^3$), and most typically a first volume within a range of about 100 cc. (6.10 $in^3$) to about 150 cc. (9.15 $in^3$). However, the present invention may be adapted to allow any volume of propellant to be supplied to the filling head 100. For example, a necked-in aerosol container with the dimensions of 200/202×700 (5.08/5.40 cm.×17.78 cm.) and that has a container volume of 360 cc. (21.97 $in^3$), preferably is injected with a first volume of propellant of about 120 cc. (7.32 $in^3$). The pressure at which the propellant is injected into the filling head 100 upstream of the container 20 is preferably within a range of about 500 psig. to about 1200 psig. (3.45 MPa. to 8.27 MPa.). The pressure at which the propellant is injected into the container 20 is less than the pressure at which the propellant is injected into the filling head 100. Further, the pressurized propellant is introduced into the filling head during a propellant fill time period. Preferably, the propellant fill time period has a duration within a range of about 0.3 sec. to about 5.0 sec. In the example described above, and with respect to FIGS. 5 and 8, it is preferred that the propellant fill time period last less than about 1.5 sec.

The propellant enters the filling head 100 at a first end 164 of a propellant inlet port 168. The propellant is transferred through a first propellant conduit 172 to a first chamber 176 adjacent a first movable valve element 180. The propellant thereafter continues through a second propellant conduit 181 to a second chamber 182, wherein the second chamber 182 is disposed below a shoulder 184 of a second movable valve element 186. The first and second movable valve elements 180, 186 are separate structures that are fastened together adjacent a diaphragm 188 to form a first valve 190. During the propellant filling cycle, the pressurized propellant within the second chamber 182 moves the first valve 190 from a closed position to an open position. Specifically, the second movable valve element 186 of the first valve 190 includes a sealing surface 200 that is engageable with a valve seat 202. When the pressurized propellant is introduced into the second chamber 182 a pressure differential is established across the first and second movable valve elements 180, 186 such that the elements are moved upwardly against a force exerted by a second spring 206. The first valve 190 is thus opened and propellant flows under pressure into a first exit chamber 210. The propellant is then introduced under pressure to the recess 108 by way of a passage 212. After the pressurized propellant enters the recess 108, the propellant passes through and around the valve stem 36 and into the container 20, as shown by the arrows A in FIG. 2. Some of the propellant is forced down the dip tube 46, but the majority flows past a stem gasket 220 of the valve assembly 35 into the interior of the container 20. In a different embodiment, the majority of the propellant is forced through the valve stem 36. At the end of the stroke of the first metering cylinder 160, the pressure of the propellant drops, thereby allowing the movable valve elements 180, 186 to move under the influence of the second spring 206 into sealing engagement with the first valve seat 202. The first valve 190 is thus closed.

Conventionally, upon completion of the propellant fill cycle and closure of the first valve 190, the filling head 100 is retracted from sealing engagement with the pedestal 34. One problem with this type of conventional filling operation is that a quantity of the propellant remains in the voids of the filling head 100, the mounting cup 28, the pedestal 34, the passage 212, and the valve stem 36 as the filling head 100 is removed from the container 20 after each cycle. This causes a release of propellant into the atmosphere. In some instances the propellant is a volatile organic compound (hereinafter "VOC"), which has been identified as a potential ecological problem. Another problem with this conventional filling cycle is that at the completion of the filling operation, the dip tube 46 of the container 20 frequently contains only propellant. Thus, when a user initially tries to spray the product, pure propellant is initially sprayed instead.

The embodiments disclosed herein provide an incompressible purge medium, such as an incompressible fluid, to eliminate the excess propellant left over from the propellant filling cycle. As used herein, the term "medium" encompasses a fluid having one or more constituents or components. In practice, once the predetermined amount of propellant is introduced into the container 20, a dwell period is entered into by the controller 115. The dwell period lasts a predetermined amount of time. In one embodiment, the dwell period comprises a purge cycle, wherein a second valve 250 of the filling head 100 is opened upon initiation of the dwell period for delivering the incompressible purge medium to the container 20. The incompressible purge medium is introduced during a purge time period that has a duration equal to or substantially equal to the entire duration of the dwell period. However, in a preferred embodiment, the dwell period includes a delay period of a first duration followed by a purge time period of a second duration. Just prior to or during the delay period, filling of the container 20 with propellant terminates and the filling head 100 remains in sealing engagement with the container 20 prior to introduction of the purge medium into the passage 212. In this manner, the delay period ensures that first valve 190 has closed prior to opening of the second valve 250 and initiation of the purge cycle. While the delay period may last for any period of time, including the absence of a delay period in its entirety, it is preferred that the delay period be within a range of about 0.05 sec. to about 1.0 sec., and more preferably within a range of about 0.05 sec. to about 0.2 sec., and most preferably the delay period lasts for about 0.1 sec. Further, it is preferred that the purge time period be within a range of about 0.05 sec. to about 5.0 sec, and more preferably the purge time period lasts about 0.5 sec., and most preferably the purge time period lasts about 0.2 sec.

The incompressible purge medium may comprise a liquid, and more particularly an aqueous or non-aqueous liquid. Further, the incompressible purge medium as defined herein should be broadly interpreted to comprise any liquid or fluid. Still further, while it is preferred than an incompressible purge medium be utilized in the present invention, it is also recognized that compressible mediums, such as gases, may be used. An example of a non-aqueous liquid that could be used with the present embodiments is an aliphatic hydrocarbon solvent such as EXXOL ® D95. The hydrocarbon solvent preferably has a vapor pressure less than 1 mm. Hg (non-VOC). The incompressible fluid may also be a liquid that has corrosion resistant properties or may be a liquid that exhibits microbiological contamination resistant properties. In fact, any type of incompressible purge medium may be used with the embodiments disclosed herein that are known to those skilled in the art. The exact purge medium is dependent on the product contained within the container 20. It is also preferred that the purge medium comprise a fluid that is a component of the product to be dispensed so as not to contaminate the product.

Figure 9:
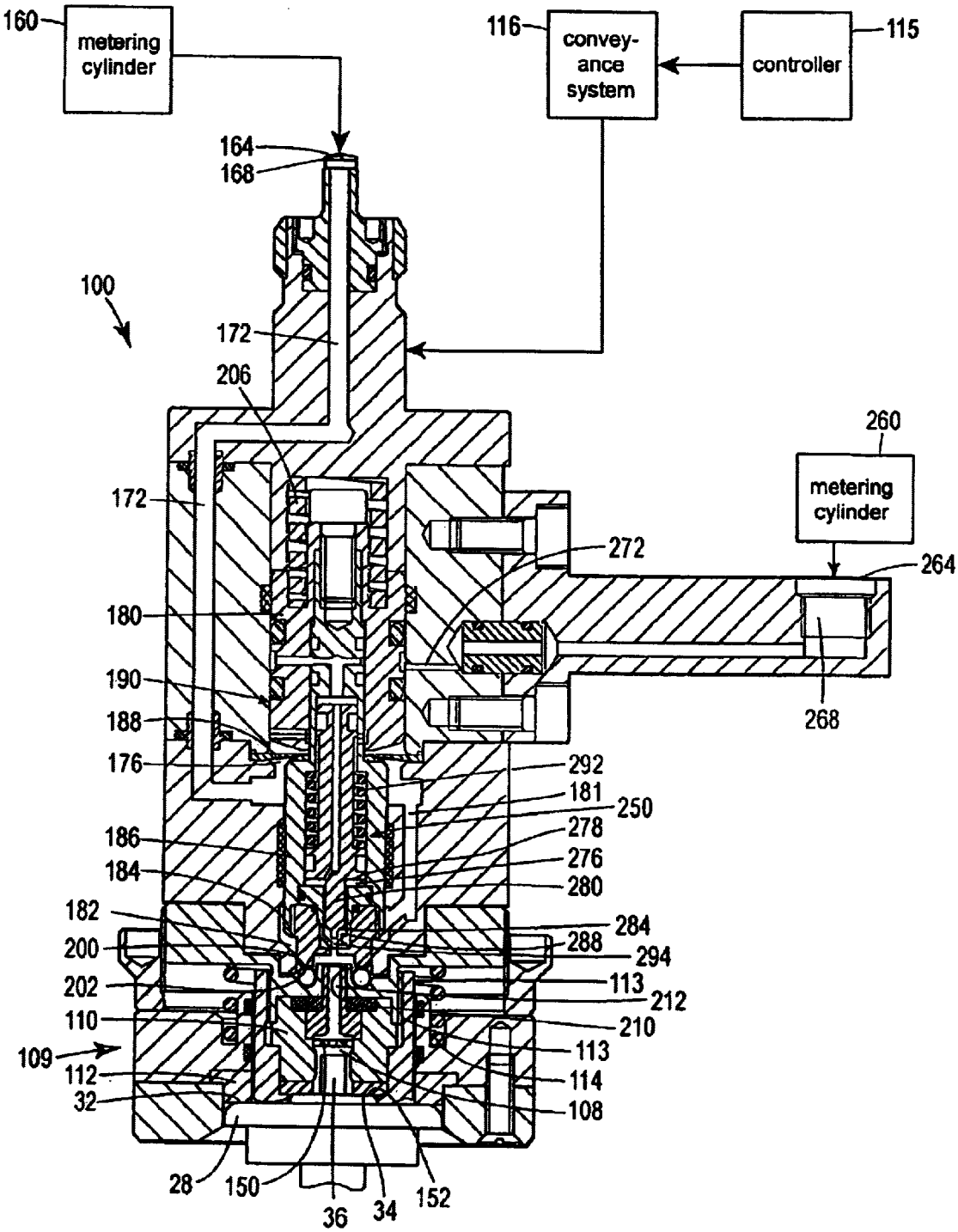
FIG. 9 is a cross-sectional view of the filling head and the top end of the aerosol container of FIG. 6 during a purge cycle.

During the purge cycle depicted in FIG. 9, a second metering cylinder 260 is operated by a controller (again, which may be the controller 115) to introduce a predetermined amount of the incompressible purge medium to the filling head 100. The predetermined amount of incompressible purge medium supplied to the filling head 100 comprises a second volume typically within a range of about 0.1 cc. (0.01 $in^3$) to about 2.5 cc. (0.15 $in^3$), and more typically within a range of about 0.6 cc. (0.04 $in^3$) to about 1.2 cc. (0.07 $in^3$). However, the present invention may be adapted to allow any volume of incompressible purge medium to be supplied to any size container through the filling head 100. In one example, a necked-in aerosol container with the dimensions of 200/202×700 (5.08/5.40 cm.×17.78 cm.) and that has a container volume of 360 cc. (21.97 $in^3$), is injected with a second volume of the incompressible purge medium within a range of about 0.75 cc. (0.046 $in^3$) to about 1.0 cc. (0.061 $in^3$). Further, the pressure at which the incompressible purge medium is injected into the filling head 100 upstream of the container 20 is preferably within a range of about 450 psig. to about 2000 psig. (3.10 MPa. to 13.79 MPa.). The pressure at which the incompressible purge medium is injected into the container 20 is less than the pressure at which the propellant is injected into the filling head 100.

The incompressible purge medium from the second metering cylinder 260 enters the filling head 100 at a first end 264 of a purge medium inlet port 268. The incompressible purge medium is transferred through a purge medium conduit 272 to a third chamber 276. During the purge cycle, the incompressible purge medium within the third chamber 276 interacts with a third shoulder 278 of the second valve 250 to move the second valve 250 from a closed position to an open position. Specifically, the second valve 250 includes a third movable valve element 280, wherein the third movable element 280 has a second sealing surface 284 that is engageable with a second valve seat 288. When the pressurized incompressible purge medium is introduced into the third chamber 276, a pressure differential is established across the third movable valve element 280 such that the element is moved upwardly against a force exerted by a third spring 292. The second valve 250 is thus opened and the incompressible purge medium flows under pressure into a second exit chamber 294. The second exit chamber 294 is in fluid communication with the first exit chamber 210 and the passage 212, thereby allowing the incompressible purge medium to purge any propellant still within the filling head 100, the passage 212, the recess 108, and/or within any recess of the mounting cup 28 of the pedestal 34. In addition, a small amount of the incompressible purge medium flows through and around the valve stem 36 and into the container 20, as shown by the arrow A in FIG. 1. Some of the incompressible purge medium and excess propellant is forced down the dip tube 46, but most flows past the stem gasket 220 of the valve assembly 35 into the interior of the container 20. At the end of a stroke of the second metering cylinder 260, the pressure of the introduced imcompressible purge medium drops, thereby allowing the third movable valve element 280 to move under the influence of the third spring 292 into sealing engagement with the second valve seat 288. The second valve 250 is thus closed.

Subsequent to the fill and purging cycles, the dwell period ends and the filling head 100 is retracted from the mounting cup 28 of the container 20. After the filling head 100 is retracted, the container 20 is conveyed away and a new container is disposed beneath the filling head 100 to repeat the filling and purging cycles. The above-described operation can be controlled by a combination of pneumatic, electromechanical, mechanical, and/or hydraulic controls in a manner well known in the art. The pressure of the incompressible purge medium as it is being injected and the duration of the purge cycle can be varied to optimize the purging effect. These parameters depend primarily upon the pressure to be developed within the container 20, which is turn depends upon such factors as the type of propellant and the propellant temperature. The purging cycle duration and the purging medium pressure are also influenced by the sizes and geometry of the various components including the cross-sectional size of the orifice 50 of the valve stem 36, the length of the valve stem 36, the cross-sectional size and length of the valve body 37, the button exit orifice size, etc. Other factors may also affect the desired pressure of the purge medium, the time at which the purge cycle is initiated, and the duration of the purge cycle.

INDUSTRIAL APPLICABILITY

The filling head assembly described herein advantageously allows for the purging of residual propellant left from a propellant fill cycle of an aerosol container. The purging is accomplished by utilizing an incompressible purge medium to flush out the residual propellant left in the filling head assembly and an aerosol valve stem of the container. Significant amount of propellant are therefore prevented from escaping into the atmosphere.

Numerous modification will be apparent to those skilled in the art in view of the foregoing description. Accordingly, this description is to be construed as illustrative only and is presented for the purpose of enabling those skilled in the art to make and use what is herein disclosed and to teach the best mode of carrying out same. The exclusive rights to all modifications which come within the scope of this disclosure are reserved.

We claim:

1. A method of minimizing propellant emissions during the filling of an aerosol container, the aerosol container having a valve attached thereto and a valve stem extending from the valve, the method comprising the steps of:

engaging a filling head with the container so as to encase the valve stem within a recess of the filling head, the filling head further being disposed in a sealed relationship with a portion of the container;

introducing a first volume of a pressurized propellant into the filling head at a sufficient pressure to force the propellant through and around the valve stem and into the container;

introducing a second volume of an incompressible purge medium into the filling head at a sufficient pressure to force the incompressible purge medium through and around the valve stem, wherein the incompressible purge medium flushes out residual propellant from the filling head and into the container; and disengaging the filling head from the container.

2. The method of claim 1, wherein the incompressible purge medium comprises a liquid.

3. The method of claim 2, wherein the liquid is substantially aqueous.

4. The method of claim 1, wherein an engaging element within the filling head depresses the valve stem prior to introducing the pressurized propellant.

5. The method of claim 1, wherein the pressurized propellant is introduced into the filling head over a propellant fill time period within a range of about 0.3 sec. to about 5.0 sec.

6. The method of claim 1, including the additional step of initiating a dwell period after the pressurized propellant is introduced into the filling head and forced through and around the valve stem.

7. The method of claim 6, wherein the introduction of the incompressible purge medium into the filling head occurs during the dwell period.

8. The method of claim 6, wherein the dwell period comprises a delay period and a purge time period, the incompressible purge medium being introduced into the filling head during the purge time period.

9. The method of claim 8, wherein the purge time period is within a range of about 0.05 sec. to about 5.0 sec.

10. The method of claim 1, wherein the first volume is within a range of about 5 cc. to about 1200 cc.

11. The method of claim 1, wherein the second volume is within a range of about 0.1 cc. to about 2.5 cc.

12. The method of claim 1, wherein the pressurized propellant is introduced into the filling head within a range of about 500 psig. to about 1200 psig.

13. The method of claim 1, wherein the incompressible purge medium is introduced into the filling head within a range of about 450 psig. to about 2000 psig.

14. A filling head, comprising:

first means for forming a fluid-tight filling passage;

second means for selectively supplying propellant under pressure to the first forming means; and third means for selectively supplying an incompressible purge medium to the first forming means.

15. The filling head of claim 14, wherein the first means comprises a member defining a recess in a lower portion of the filling head, the recess being adapted to encase a valve stem of a container.

16. The filling head of claim 14, wherein the second means includes a metering cylinder for introducing a first volume of the pressurized propellant to a propellant inlet port of the filling head within a volume range of about 5 cc. to about 1200 cc. and a pressure range of about 500 psig. to about 1200 psig.

17. The filling head of claim 16, wherein the second means further includes a propellant conduit in fluid communication with the propellant inlet port and a valve, wherein when the valve is in a closed position a sealing surface of the valve is sealingly engaged with a valve seat, and when the valve is in an open position the sealing surface is spaced from the valve seat, and wherein the open position places the propellant conduit in fluid communication with the first means.

18. The filling head of claim 14, wherein the third means includes a metering cylinder for introducing a volume of the incompressible purge medium to a purge medium inlet port of the filling head within a volume range of about 0.1 cc. to about 2.5 cc. and a pressure range of about 450 psig. to about 2000 psig.

19. The filling head of claim 18, wherein the third means further includes a purge medium conduit in fluid communication with the purge medium inlet port and a valve, wherein when the valve is in a closed position a sealing surface of the valve is sealingly engaged with a valve seat, and when the valve is in an open position the sealing surface is spaced from the valve seat, and wherein the open position places the purge medium conduit in fluid communication with the first means.

20. A filling head, comprising:

a lower portion adapted to encase a valve stem of a container;

a propellant inlet port and a propellant conduit in fluid communication with the propellant inlet port;

a first valve adapted to move between a closed position and an open position, wherein when the first valve is in the closed position a sealing surface of the first valve is sealingly engaged with a valve seat, and when the first valve is in the open position the sealing surface is spaced from the valve seat, and wherein the open position places the propellant conduit in fluid communication with a first exit chamber;

a purge medium inlet port and a purge medium conduit in fluid communication with the purge medium inlet port; and a second valve adapted to move between a closed and an open position, wherein when the second valve is in the closed position a second sealing surface of the second valve is sealingly engaged with a second valve seat, and when the second valve is in the open position the second sealing surface is spaced from the second valve seat, and wherein the open position places the purge medium conduit in fluid communication with a second exit chamber.

* * * * *